(12) United States Patent  
Ohashi et al.

(10) Patent No.: US 9,056,312 B2  
(45) Date of Patent: Jun. 16, 2015

(54) SUBSTRATE FOR CARBON NANOTUBE GROWTH AND METHOD FOR MANUFACTURING THE SAME

(71) Applicant: HONDA MOTOR CO., LTD., Tokyo (JP)

(72) Inventors: Toshiyuki Ohashi, Wako (JP); Toshio Tokune, Wako (JP); Masahiro Ohta, Wako (JP); Ryogo Kato, Wako (JP); Toshiyuki Shima, Tagajo (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/095,426

(22) Filed: Dec. 3, 2013

(65) Prior Publication Data

US 2014/0155250 A1   Jun. 5, 2014

(30) Foreign Application Priority Data

Dec. 4, 2012  (JP) .................................. 2012-265823  
Nov. 28, 2013  (JP) .................................. 2013-246431

(51) Int. Cl.
  *B01J 21/00* (2006.01)  
  *B01J 21/04* (2006.01)  
  *B01J 23/00* (2006.01)  
  *B01J 23/02* (2006.01)  
  (Continued)

(52) U.S. Cl.  
  CPC .............. *B01J 23/8906* (2013.01); *B82Y 30/00* (2013.01); *B82Y 40/00* (2013.01); *C01B 31/0233* (2013.01)

(58) Field of Classification Search  
  CPC ............ B01J 23/00; B01J 23/40; B01J 23/42; B01J 23/745; B01J 23/8906; B01J 23/8933; B01J 21/00  
  USPC ......... 502/300, 326, 334, 336, 338, 339, 439, 502/252, 258, 262, 328; 429/487, 524, 527, 429/529, 532  
  See application file for complete search history.

(56) References Cited

U.S. PATENT DOCUMENTS 3,839,225 A * 10/1974 Acres ............................ 502/177  
3,840,471 A * 10/1974 Acres ............................ 502/177  
(Continued)

FOREIGN PATENT DOCUMENTS

JP      2008-037670     2/2008

OTHER PUBLICATIONS

Xuan Wang, et al., "Bimetallic Catalysts for the Efficient Growth of SWNTs on Surfaces", Chem. Mater, 2004, 16, pp. 799-805.  
(Continued)

*Primary Examiner* — Cam N. Nguyen  
(74) *Attorney, Agent, or Firm* — Rankin, Hill & Clark LLP (57) ABSTRACT

Provided is a substrate for carbon nanotube growth in which no metal particles as a catalyst aggregates and a method for manufacturing the substrate. A substrate for carbon nanotube growth 1 includes a base plate 2, a noble metal alloy catalyst 3 having an alloy of a noble metal and a transition metal, and a form-defining material layer 4 which allows the noble metal alloy catalyst 3 to be dispersed and arranged. A method for manufacturing a substrate for carbon nanotube growth 1 includes a step of sputtering a noble metal alloy on a base plate 2, a step of sputtering a form-defining material on the base plate 2, and a step of further sputtering the noble metal alloy on the form-defining material.

7 Claims, 6 Drawing Sheets

(51) Int. Cl.
- *B01J 23/40* (2006.01)
- *B01J 23/42* (2006.01)
- *B01J 23/44* (2006.01)
- *B01J 23/58* (2006.01)
- *B01J 23/70* (2006.01)
- *B01J 23/74* (2006.01)
- *B01J 23/89* (2006.01)
- *C01B 31/02* (2006.01)
- *B82Y 30/00* (2011.01)
- *B82Y 40/00* (2011.01)

(56) References Cited

U.S. PATENT DOCUMENTS

| | | | |
|---|---|---|---|
| 4,925,824 A * | 5/1990 | Sapienza et al. | 502/262 |
| 7,220,498 B2 * | 5/2007 | Nagahama et al. | 428/811.1 |
| 7,585,811 B2 * | 9/2009 | Nakamura et al. | 502/327 |
| 7,687,051 B2 * | 3/2010 | Hagemeyer et al. | 423/655 |
| 8,124,275 B2 * | 2/2012 | Washima et al. | 429/209 |
| 8,309,489 B2 * | 11/2012 | Roldan Cuenya et al. | 502/339 |
| 2006/0160695 A1 * | 7/2006 | Zhou et al. | 502/152 |
| 2008/0193370 A1 * | 8/2008 | Hampden-Smith et al. | 423/651 |
| 2010/0022386 A1 * | 1/2010 | Hagemeyer et al. | 502/303 |
| 2010/0323884 A1 * | 12/2010 | Roldan Cuenya et al. | 502/339 |

OTHER PUBLICATIONS

Stephanie Reich, et al., "Control the chirality of carbon nanotubes by epitaxial growth", Chemical Physics Letters, 2006, 421, pp. 469-472.

Hongwei Zhu, et al., "Atomic-Resolution Imaging of the Nucleation Points of Single-Walled Carbon Nonotubes", Small, 2005, 1, No. 12, pp. 1180-1183.

* cited by examiner

SUBSTRATE FOR CARBON NANOTUBE GROWTH AND METHOD FOR MANUFACTURING THE SAME

BACKGROUND OF THE INVENTION

1. Field of the Invention

The present invention relates to a substrate for carbon nanotube growth and a method for manufacturing the same.

2. Description of the Related Art

Carbon nanotubes are substances having such a structure that a graphene sheet in which a plurality of carbon 6-membered rings are bonded in a planar manner is wound in a cylindrical manner, and there are 3, types of carbon nanotubes, armchair type, chiral type, and zigzag type, depending on the winding manner. The 3, types of carbon nanotubes each vary in terms of electric characteristics depending on the diameter and chirality thereof, exhibiting metallic properties or semiconductor properties.

Therefore, in order to obtain carbon nanotubes depending on the intended use, it is necessary to control diameter and chirality. In order to control the diameter and chirality of the carbon nanotubes, there is known a metal particle as a catalyst, wherein a crystal plane is used on which constituent elements of the metal particle are arranged in a triangle lattice (see, for example, Japanese Patent No. 4979296,, Stephanie Reich, Lan Li, and John Robertson, "Control the chirality of carbon nanotubes by epitaxial growth", Chemical Physics Letters, 2006, 421,, pp. 469-472).

As a substrate for carbon nanotube growth in which the metal particle including the crystal plane is used as a catalyst, there is known a substrate obtained by forming a $SiO_2$ film and a Co film in this order on the surface of each of $SiO_2$, nanoparticles arranged on a base plate, and heat-treating the resultant to thereby form Co nanoparticles on the $SiO_2$ film (see, for example, Hongwei Zhu, Kazutomo Suenaga, Ayako Hashimoto, Kouki Urita, Kenji Hata, and Sumio Iijima, "Atomic-Resolution Imaging of the Nucleation Points of Single-Walled Carbon Nanotubes", Small, 2005, 1,, No. 12,, pp. 1180-1183).

As another substrate for carbon nanotube growth, there is known a substrate obtained by applying a solution of a metal chloride as a catalyst and poly(N-vinyl-2-pyrrolidone) in glycol on a base plate and heat-treating the resultant. With respect to the substrate for carbon nanotube growth, while $FeCl_3$, and $H_2PtCl_6.6H_2O$ can be used for the metal chloride to thereby provide a substrate including Fe and Pt nanoparticles, $FeCl_3$, and $RuCl_3.3H_2O$ can be used therefor to thereby provide a substrate including Fe and Ru nanoparticles (see, for example, Xuan Wang, Wendo Yue, Maoshuai He, manhong Liu, Jin Zhang, and Zhongfan Liu, "Bimetallic Catalysts for the Efficient Growth of SWNTs on Surfaces", Chem.Mater, 2004, 16,pp. 799-805).

However, the conventional substrates for carbon nanotube growth have a disadvantage that the metal particles as a catalyst aggregate due to heat during the production of carbon nanotubes to make it impossible to grow carbon nanotubes having a small diameter at a high density.

SUMMARY OF THE INVENTION

An object of the present invention is to overcome the disadvantage, providing a substrate for carbon nanotube growth in which no metal particles as a catalyst aggregates and a method for manufacturing the substrate.

In order to achieve the object, the present invention provides a substrate for carbon nanotube growth including a base plate and a catalyst disposed on the base plate, the substrate including a noble metal alloy catalyst having an alloy of a noble metal and a transition metal, and a form-defining material layer which is formed on the base plate to define a form which allows the noble metal alloy catalyst to be dispersed and arranged.

Since the substrate for carbon nanotube growth of the present invention includes on the base plate the form-defining material layer which allows the noble metal alloy catalyst to be dispersed and arranged, the form-defining material layer can prevent the noble metal alloy catalyst from aggregating. Accordingly, the substrate for carbon nanotube growth of the present invention can grow carbon nanotubes having a small diameter at a high density.

In the substrate for carbon nanotube growth of the present invention, the form-defining material layer preferably controls the plane direction of the crystal structure of the noble metal alloy catalyst to thereby define the form of the noble metal alloy catalyst. According to the substrate for carbon nanotube growth of the present invention, the form-defining material layer controls the plane direction of the crystal structure of the noble metal alloy catalyst, thereby making it possible to control the diameter and chirality of carbon nanotubes to be grown on the substrate.

In the substrate for carbon nanotube growth of the present invention, as the noble metal alloy catalyst, for example, a catalyst having $Fe_xPt_{1-x}$ ($0.3 \leq x \leq 0.7$, preferably $0.3 \leq x \leq 0.6$, further preferably $0.3 \leq x \leq 0.37$) can be used.

In the substrate for carbon nanotube growth of the present invention, for example, a base plate having MgO (100) single crystal can be used as the base plate. MgO (100) single crystal has a lattice constant close to that of the $Fe_xPt_{1-x}$ ($0.3 \leq x \leq 0.7$), and thus is suitable for the base plate.

In the substrate for carbon nanotube growth of the present invention, the material for use in the form-defining material layer is desirably the same as that for the base plate. For example, when the base plate has MgO (100) single crystal, one having MgO which is the same material as the base plate in terms of substance can be used for the form-defining material layer.

The method for manufacturing a substrate for carbon nanotube growth of the present invention is a method for manufacturing a substrate for carbon nanotube growth including a base plate and a catalyst disposed on the base plate, the method including a step of sputtering on the base plate a noble metal alloy having a noble metal and a transition metal, a step of sputtering on the base plate a form-defining material which defines a form which allows a catalyst having the noble metal alloy to be dispersed and arranged, and a step of further sputtering the noble metal alloy on the form-defining material.

According to the method for manufacturing a substrate for carbon nanotube growth of the present invention, first, the noble metal alloy is sputtered on the base plate, and the form-defining material is sputtered. Then, the noble metal alloy is further sputtered on the form-defining material, thereby exhibiting such a behavior that the form-defining material is reconstructed by heat during the sputtering to run around below the noble metal alloy, thereby being integrated with the base plate.

As a result, the noble metal alloy is made into particles to form a noble metal alloy catalyst, and the form-defining material forms a form-defining material layer which defines a form which allows the noble metal alloy catalyst to be dispersed and arranged. A part of the noble metal alloy catalyst is herein embedded in the form-defining material layer, thereby making it possible to prevent the noble metal alloy catalyst from aggregating and to control the plane direction of the crystal structure of the noble metal alloy catalyst by the form-defining material layer.

In the method for manufacturing a substrate for carbon nanotube growth of the present invention, the step of sputtering on the base plate a form-defining material which defines a form which allows a catalyst having the noble metal alloy to be dispersed and arranged and the step of further sputtering the noble metal alloy on the form-defining material are preferably repeated in a plurality of times.

According to the method for manufacturing a substrate for carbon nanotube growth of the present invention, the step of sputtering the form-defining material and the step of further sputtering the noble metal alloy on the form-defining material are repeated in a plurality of times, thereby making it possible to control the particle size of the noble metal alloy catalyst.

DETAILED DESCRIPTION OF THE PREFERRED EMBODIMENTS

Then, embodiments of the present invention will be described in more detail with reference to the accompanied drawings.

Figure 1:
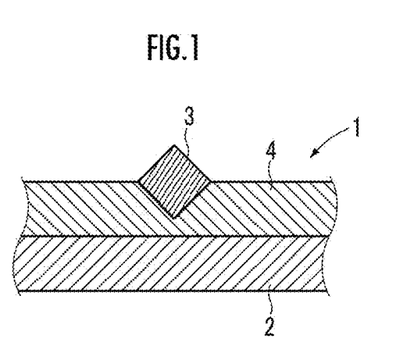
FIG. 1 is an illustrative cross-sectional view illustrating a configuration of a substrate for carbon nanotube growth according to the present invention.

As illustrated in FIG. 1, a substrate for carbon nanotube growth 1 of the present embodiment includes a noble metal alloy catalyst 3 disposed on a base plate 2, and a form-defining material layer 4 which defines a form which allows the noble metal alloy catalyst 3 to be dispersed and arranged. In the present embodiment, the noble metal alloy catalyst 3 has an alloy of a noble metal and a transition metal, and examples of such an alloy include an alloy of Pt and Fe, represented by general formula $Fe_xPt_{1-x}$ ($0.3 \leq x \leq 0.7$).

When the noble metal alloy catalyst 3 is the alloy represented by general formula $Fe_xPt_{1-x}$ ($0.3 \leq x \leq 0.7$), the base plate 2 which can be used is one having a lattice constant close to that of $Fe_xPt_{1-x}$ ($0.3 \leq x \leq 0.7$), and examples of such base plate 2 include one consisting of MgO (100) single crystal. In this case, the form-defining material layer 4 desirably consists of the same material as the base plate 2. Accordingly, when the base plate 2 consists of MgO (100) single crystal, the form-defining material layer 4 desirably consists of MgO which is the same material as the base plate 2 in terms of substance.

The form-defining material layer 4 has a part of the noble metal alloy catalyst 3 embedded therein, thereby defining a form which allows the noble metal alloy catalyst 3 to be dispersed and arranged, and controlling the plane direction of the crystal structure of the noble metal alloy catalyst 3. As a result, for example, the noble metal alloy catalyst 3 has a regular octahedron shape in the case of having FePt (in the general formula, x=0.5), and thus the {111} plane thereof is exposed from the form-defining material layer 4.

The noble metal alloy catalyst 3 is adjusted so that x in general formula $Fe_xPt_{1-x}$ ranges from 0.3 to 0.7, preferably from 0.3 to 0.6, further preferably from 0.3 to 0.37, and thus can have a truncated square pyramid shape in which a part exposed from the form-defining material layer 4, of a regular octahedron shape, is chamfered.

According to the substrate for carbon nanotube growth 1 of the present embodiment, since a part of the noble metal alloy catalyst 3 is embedded in the form-defining material layer 4, and dispersed and arranged therein, the noble metal alloy catalyst 3 can be prevented from aggregating and a carbon nanotube forest can be produced. In addition, since the plane direction of the crystal structure of the noble metal alloy catalyst 3 is controlled by the form-defining material layer 4, the diameter, chirality, and the like of carbon nanotubes to be produced can be controlled.

The "carbon nanotube forest" herein means aggregate of carbon nanotubes produced on the substrate for carbon nanotube growth 1 in the perpendicular orientation at a high density.

Then, a method for manufacturing a substrate for carbon nanotube growth 1 of the present embodiment will be described.

In the manufacturing method of the present embodiment, first, for example, a noble metal alloy consisting of FePt is sputtered on a base plate 2 consisting of, for example, MgO (100) at a temperature ranging from 650 to 800° C., for example, at a temperature of 740° C. using a high-vacuum magnetron sputtering apparatus. Then, a form-defining material consisting of, for example, MgO is sputtered at around room temperature (100° C. or lower) using the high-vacuum magnetron sputtering apparatus. Then, the noble metal alloy is further sputtered on the form-defining material in the same manner as described above.

Thus, MgO of the form-defining material sputtered at room temperature exhibits such a behavior that it is reconstructed by heat during the next sputtering of the noble metal alloy consisting of FePt to run around below the FePt, thereby being integrated with MgO of the base plate 2. Such a behavior of the MgO allows the FePt to be made into particles to form a noble metal alloy catalyst 3 consisting of $Fe_xPt_{1-x}$ ($0.3 \leq x \leq 0.7$), and allows the MgO to form a form-defining material layer 4 which defines a form which allows the noble metal alloy catalyst 3 to be dispersed and arranged. A part of the noble metal alloy catalyst 3 is herein embedded in the form-defining material layer 4, thereby making it possible to prevent the noble metal alloy catalyst 3 from aggregating and to control the plane direction of the crystal structure of the noble metal alloy catalyst 3 by the form-defining material layer 4.

In the manufacturing method of the present embodiment, after the noble metal alloy is sputtered on the base plate, a step of sputtering the form-defining material and a step of further sputtering the noble metal alloy on the form-defining material may be repeated in a plurality of times. The thicknesses of the form-defining material and the noble metal alloy and a number of repeating the steps are changed, thereby making it possible to control the particle size of the noble metal alloy catalyst 3.

Then, Examples of the present invention and Comparative Examples thereof will be described.

EXAMPLE 1

In the present Example, first, a noble metal alloy having FePt was sputtered on a base plate 2 consisting of MgO (100) at a temperature of 740° C. using a high-vacuum magnetron sputtering apparatus so that the thickness was 1.0 nm Then, an operation, where a form-defining material consisting of MgO was sputtered at room temperature (25° C.) so that the thickness was 1.0 nm and a noble metal alloy consisting of FePt was further sputtered on the form-defining material at a temperature of 740° C. so that the thickness was 1.0 nm, was repeated 4 times.

As a result, obtained was a substrate for carbon nanotube growth 1 including on the base plate 2, a noble metal alloy catalyst 3, and a form-defining material layer 4 which defines a form which allows the noble metal alloy catalyst 3 to be dispersed and arranged. A transmission electron microscope photograph of the resulting substrate for carbon nanotube growth 1 is shown in FIG. 2.

Figure 2:
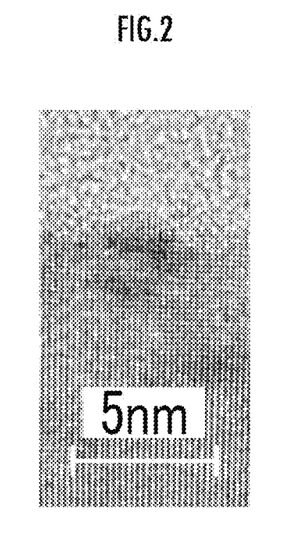
FIG. 2 is a transmission electron microscope photograph showing a cross-section structure of a substrate for carbon nanotube growth obtained in Example 1.

It is clear from FIG. 2 that regular octahedron particles having a maximum diameter of 5 nm with the {111} plane exposed on the surface thereof are epitaxially grown on the substrate for carbon nanotube growth 1 obtained in the present Example. The regular octahedron particles were subjected to energy dispersive X-ray analysis (EDX), and found to have a composition of 60% by atom of Fe and 40% by atom of Pt.

Then, the substrate for carbon nanotube growth 1 obtained in the present Example was placed on a plasma CVD apparatus set at a base plate temperature of 730° C. and an output of plasma CVD of 100 W, and gas containing 10% by volume of methane and 90% by volume of hydrogen was fed thereto to synthesis carbon nanotubes for 30 minutes. A scanning microscope photograph of the resulting carbon nanotubes is shown in FIG. 3.

Figure 3:
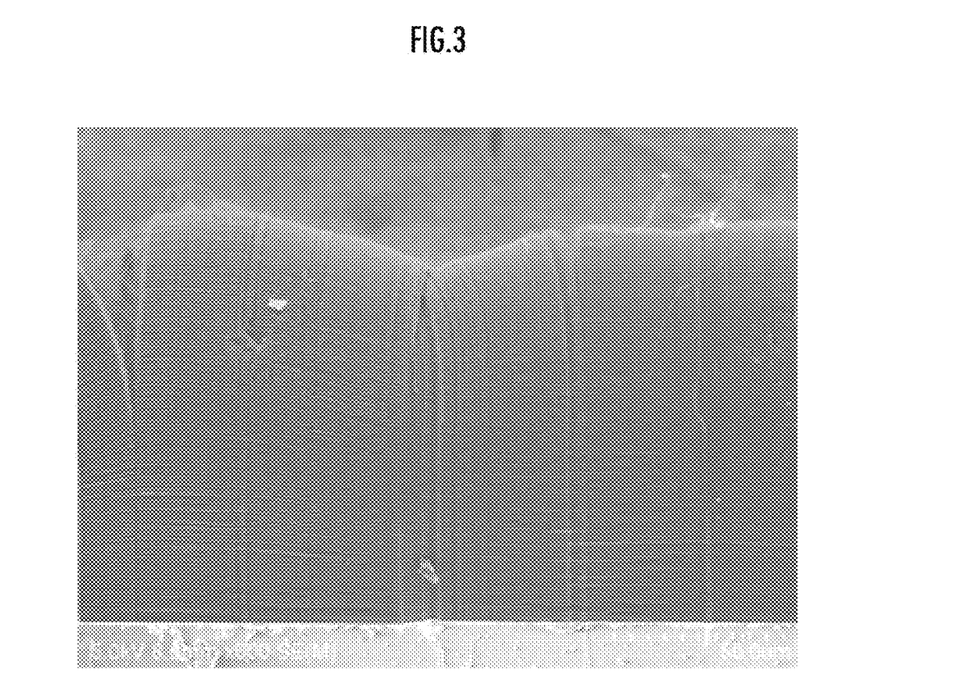
FIG. 3 is a scanning electron microscope photograph showing carbon nanotubes grown on the substrate for carbon nanotube growth obtained in Example 1.

It is clear from FIG. 3 that the substrate for carbon nanotube growth 1 obtained in the present Example is used to thereby produce a carbon nanotube forest having a length of 50 to 100 μm. The diameter of the carbon nanotubes obtained in the present Example was calculated from radial breathing mode (RBM) in the Raman spectrum, and found to have a diameter of 0.8 to 1.7 nm.

EXAMPLE 2

In the present Example, first, a noble metal alloy having FePt was sputtered on a base plate 2 consisting of MgO (100) at a temperature of 740° C. using a high-vacuum magnetron sputtering apparatus so that the thickness was 0.5 nm. Then, a form-defining material consisting of MgO was sputtered at room temperature (65° C.) so that the thickness was 1.0 nm, and a noble metal alloy consisting of FePt was further sputtered on the form-defining material at a temperature of 740° C. so that the thickness was 0.5 nm. As a result, obtained was a substrate for carbon nanotube growth 1 including on the base plate 2, a noble metal alloy catalyst 3, and a form-defining material layer 4 which defines a form which allows the noble metal alloy catalyst 3 to be dispersed and arranged. A transmission electron microscope photograph of the resulting substrate for carbon nanotube growth 1 is shown in FIG. 4.

Figure 4:
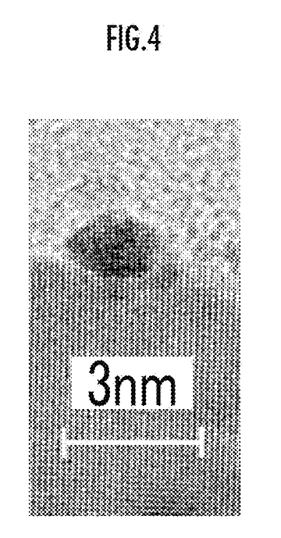
FIG. 4 is a transmission electron microscope photograph showing a cross-section structure of a substrate for carbon nanotube growth obtained in Example 2.

It is clear from FIG. 4 that regular octahedron particles having a maximum diameter of 3 nm with the {111} plane exposed on the surface thereof are epitaxially grown on the substrate for carbon nanotube growth 1 obtained in the present Example. The particles were subjected to EDX, and found to have a composition of 44% by atom of Fe and 56% by atom of Pt.

Then, carbon nanotubes were synthesized in exactly the same manner as in Example 1 except that the substrate for carbon nanotube growth 1 obtained in the present Example was used. A scanning microscope photograph of the resulting carbon nanotubes is shown in FIG. 5.

Figure 5:
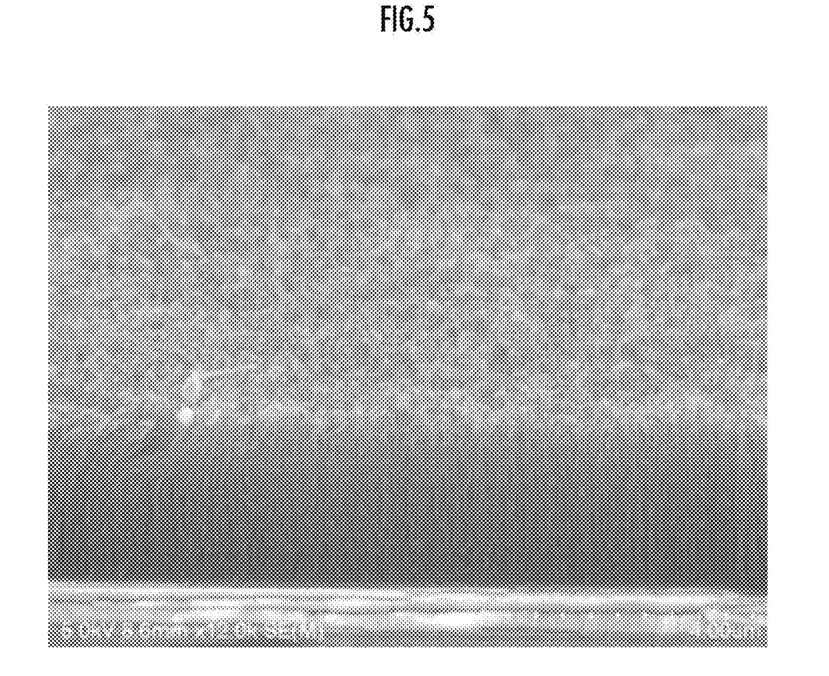
FIG. 5 is a scanning electron microscope photograph showing carbon nanotubes grown on the substrate for carbon nanotube growth obtained in Example 2.

It is clear from FIG. 5 that the substrate for carbon nanotube growth 1 obtained in the present Example is used to thereby produce a carbon nanotube forest having a length of 3 to 5 μm. The diameter of the carbon nanotubes obtained in the present Example was calculated from RBM in the Raman spectrum, and found to have a diameter of 0.8 to 1.4 nm.

EXAMPLE 3

In the present Example, first, a noble metal alloy consisting of FePt was sputtered on a base plate 2 consisting of MgO (100) at a temperature of 740° C. using a high-vacuum magnetron sputtering apparatus so that the thickness was 1.0 nm. Then, a form-defining material consisting of MgO was sputtered at room temperature (65° C.) so that the thickness was 1.0 nm, and a noble metal alloy consisting of FePt was further sputtered on the form-defining material at a temperature of 740° C. so that the thickness was 1.0 nm. As a result, obtained was a substrate for carbon nanotube growth 1 including on the base plate 2, a noble metal alloy catalyst 3, and a form-defining material layer 4 which defines a form which allows the noble metal alloy catalyst 3 to be dispersed and arranged. A transmission electron microscope photograph of the resulting substrate for carbon nanotube growth 1 is shown in FIG. 6.

Figure 6:
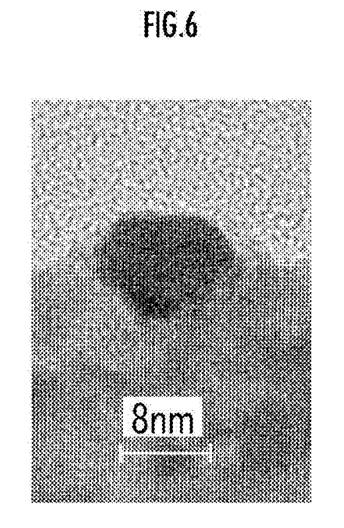
FIG. 6 is a transmission electron microscope photograph showing a cross-section structure of a substrate for carbon nanotube growth obtained in Example 3.

It is clear from FIG. 6 that particles having a maximum diameter of 8 nm with the {111} plane exposed on the surface thereof are epitaxially grown on the substrate for carbon nanotube growth 1 obtained in the present Example, and the particles has a truncated square pyramid shape in which the part exposed on the surface, of a regular octahedron shape, is chamfered. The particles were subjected to EDX, and found to have a composition of 37% by atom of Fe and 63% by atom of Pt.

Then, carbon nanotubes were synthesized in exactly the same manner as in Example 1 except that the substrate for carbon nanotube growth 1 obtained in the present Example was used. A scanning microscope photograph of the resulting carbon nanotubes is shown in FIG. 7.

Figure 7:
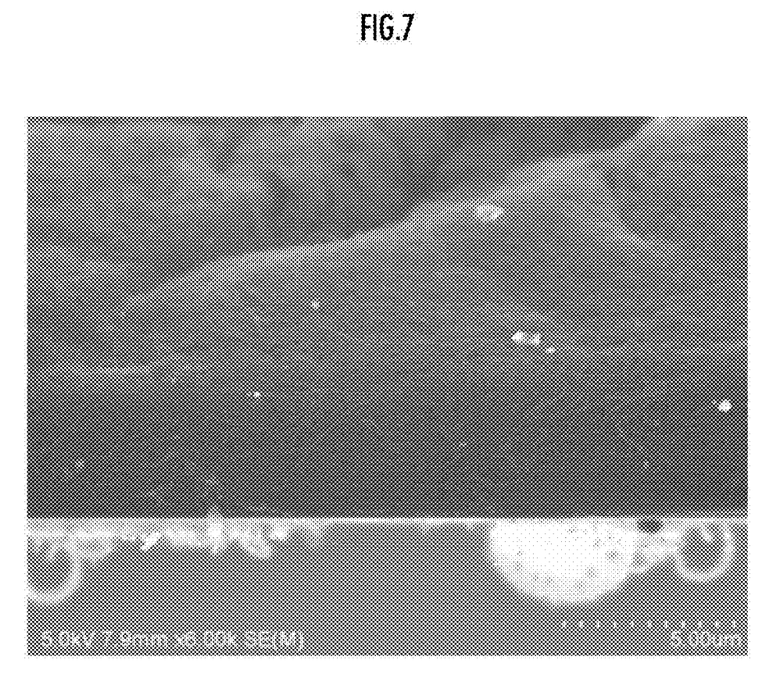
FIG. 7 is a scanning electron microscope photograph showing carbon nanotubes grown on the substrate for carbon nanotube growth obtained in Example 3.

It is clear from FIG. 7 that the substrate for carbon nanotube growth 1 obtained in the present Example is used to thereby produce a carbon nanotube forest having a length of 5 to 10 μm. The diameter of the carbon nanotubes obtained in the present Example was calculated from RBM in the Raman spectrum, and found to have a diameter of 0.8 to 1.4 nm.

EXAMPLE 4

In the present Example, first, a noble metal alloy consisting of FePt was sputtered on a base plate 2 consisting of MgO (100) at a temperature of 740° C. using a high-vacuum magnetron sputtering apparatus so that the thickness was 1.0 nm. Then, an operation, where a form-defining material consisting of MgO was sputtered at room temperature (65° C.) so that the thickness was 1.0 nm and a noble metal alloy consisting of FePt was further sputtered on the form-defining material at a temperature of 740° C. so that the thickness was 1.0 nm, was repeated twice. As a result, obtained was a substrate for carbon nanotube growth 1 including on the base plate 2, a noble metal alloy catalyst 3, and a form-defining material layer 4 which defines a form which allows the noble metal alloy catalyst 3 to be dispersed and arranged. A transmission electron microscope photograph of the resulting substrate for carbon nanotube growth 1 is shown in FIG. 8.

Figure 8:
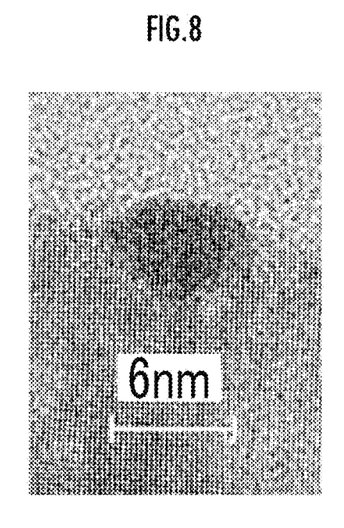
FIG. 8 is a transmission electron microscope photograph showing a cross-section structure of a substrate for carbon nanotube growth obtained in Example 4.

It is clear from FIG. 8 that particles having a maximum diameter of 6 nm with the {111} plane exposed on the surface thereof are epitaxially grown on the substrate for carbon nanotube growth 1 obtained in the present Example, and the particles has a truncated square pyramid shape in which the part exposed on the surface, of a regular octahedron shape, is chamfered. The particles were subjected to EDX, and found to have a composition of 30% by atom of Fe and 70% by atom of Pt.

Then, carbon nanotubes were synthesized in exactly the same manner as in Example 1 except that the substrate for carbon nanotube growth 1 obtained in the present Example was used. A scanning microscope photograph of the resulting carbon nanotubes is shown in FIG. 9.

Figure 9:
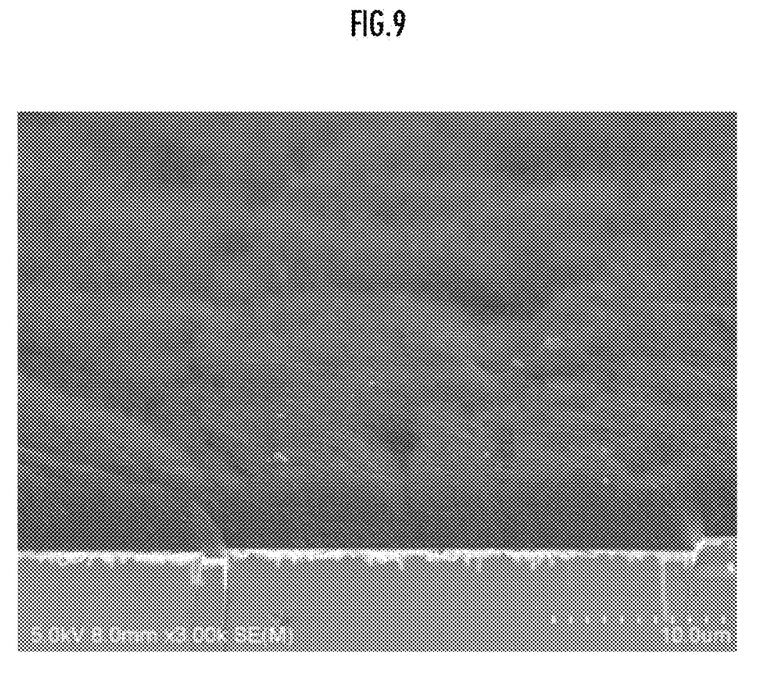
FIG. 9 is a scanning electron microscope photograph showing carbon nanotubes grown on the substrate for carbon nanotube growth obtained in Example 4.

It is clear from FIG. 9 that the substrate for carbon nanotube growth 1 obtained in the present Example is used to thereby produce a carbon nanotube forest having a length of 5 to 10 μm. The diameter of the carbon nanotubes obtained in the present Example was calculated from RBM in the Raman spectrum, and found to have a diameter of 0.8 to 1.4 nm.

COMPARATIVE EXAMPLE 1

In the present Comparative Example, first, Al was sputtered on a Si base plate at a temperature of 25° C. using a high-vacuum magnetron sputtering apparatus so that the thickness was 5.0 nm. Then, Fe was sputtered thereon at a temperature of 25° C. so that the thickness was 1.5 nm, and Al was further sputtered thereon at a temperature of 25° C. so that the thickness was 1.0 nm, to thereby provide a substrate for carbon nanotube growth. A transmission electron microscope photograph of the resulting substrate for carbon nanotube growth is shown in FIG. 10.

Figure 10:
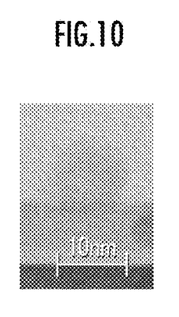
FIG. 10 is a transmission electron microscope photograph showing a cross-section structure of a substrate for carbon nanotube growth obtained in Comparative Example 1.

It is clear from FIG. 10 that the substrate for carbon nanotube growth obtained in the present Comparative Example includes spherical particles. The particles were subjected to EDX, and found to have a composition of 100% by atom of Fe and to be different from an FePt alloy.

Then, carbon nanotubes were synthesized in exactly the same manner as in Example 1 except that the substrate for carbon nanotube growth obtained in the present Comparative Example was used. However, the resulting carbon nanotubes were a mixture of carbon nanotubes including various numbers of layers, and could not provide a carbon nanotube forest having a small diameter.

COMPARATIVE EXAMPLE 2

In the present Comparative Example, first, two metals, Fe and Pt, were sputtered on a base plate 2 having MgO (100) at a temperature of 740° C. using a high-vacuum magnetron sputtering apparatus so that the total thickness was 1.0 nm. Then, an operation, where a form-defining material having MgO was sputtered at room temperature (65° C.) so that the thickness was 1.0 nm and two metals, Fe and Pt, were further sputtered on the form-defining material at a temperature of 740° C. so that the total thickness was 1.0 nm, was repeated 4 times, thereby providing a substrate for carbon nanotube growth. Particles formed on the substrate for carbon nanotube growth obtained in the present Comparative Example were subjected to EDX, and found to have a composition of 92% by atom of Fe and 8% by atom of Pt.

Then, carbon nanotubes were synthesized in exactly the same manner as in Example 1 except that the substrate for carbon nanotube growth obtained in the present Comparative Example was used. However, the resulting carbon nanotubes were a mixture of carbon nanotubes including various numbers of layers and carbon nanotubes having a large diameter, and could not provide a carbon nanotube forest having a small diameter.

COMPARATIVE EXAMPLE 3

In the present Comparative Example, first, two metals, Fe and Pt, were sputtered on a base plate 2 having MgO (100) at a temperature of 740° C. using a high-vacuum magnetron sputtering apparatus so that the total thickness was 1.0 nm. Then, an operation, where a form-defining material having MgO was sputtered at room temperature (65° C.) so that the thickness was 1.0 nm and two metals, Fe and Pt, were further sputtered on the form-defining material at a temperature of 740° C. so that the total thickness was 1.0 nm, was repeated twice, thereby providing a substrate for carbon nanotube growth. Particles formed on the substrate for carbon nanotube growth obtained in the present Comparative Example were subjected to EDX, and found to have a composition of 8% by atom of Fe and 92% by atom of Pt.

Then, carbon nanotubes were synthesized in exactly the same manner as in Example 1 except that the substrate for carbon nanotube growth obtained in the present Comparative Example was used, but a carbon nanotube forest could not be obtained.

COMPARATIVE EXAMPLE 4

In the present Comparative Example, first, Pt was sputtered on a base plate 2 having MgO (100) at a temperature of 740° C. using a high-vacuum magnetron sputtering apparatus so that the thickness was 1.0 nm. Then, MgO was sputtered at room temperature (65° C.) so that the thickness was 1.0 nm, and Pt was further sputtered on the MgO at a temperature of 740° C. so that the thickness was 1.0 nm, thereby providing a substrate for carbon nanotube growth. A transmission electron microscope photograph of the resulting substrate for carbon nanotube growth is shown in FIG. 11.

Figure 11:
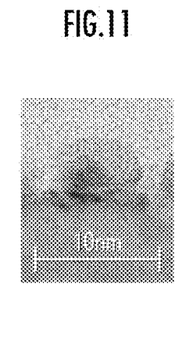
FIG. 11 is a transmission electron microscope photograph showing a cross-section structure of a substrate for carbon nanotube growth obtained in Comparative Example 4.

It is clear from FIG. 11 that the substrate for carbon nanotube growth obtained in the present Comparative Example includes spherical particles and the plane direction is not defined. The particles were subjected to EDX, and found to have a composition of 100% by atom of Pt and to be different from an FePt alloy.

Then, carbon nanotubes were synthesized in exactly the same manner as in Example 1 except that the substrate for carbon nanotube growth obtained in the present Comparative Example was used, but a carbon nanotube forest could not be obtained.

What is claimed is:

1. A substrate structure, comprising:
   a base plate;
   a form-defining layer which is formed on the base plate; and
   particles of a noble metal alloy catalyst consisting of an alloy of a noble metal and a transition metal;
   wherein the particles are dispersedly arranged on the form-defining layer with each of the particles being partially embedded in the form-defining layer, and a crystal plane having a plane direction common to each of the particles is exposed from the form-defining layer.

2. The substrate for carbon nanotube growth according to claim 1, wherein the noble metal alloy catalyst consists of $Fe_xPt_{1-x}$ ($0.3 \leq x \leq 0.7$).

3. The substrate for carbon nanotube growth according to claim 2, wherein the noble metal alloy catalyst consists of $Fe_xPt_{1-x}$ ($0.3 \leq x \leq 0.6$).

4. The substrate for carbon nanotube growth according to claim 3, wherein the noble metal alloy catalyst consists of $Fe_xPt_{1-x}$ ($0.3 \leq x \leq 0.37$).

5. The substrate for carbon nanotube growth according to claim 1, wherein the base plate consists of MgO (100) single crystal.

6. The substrate for carbon nanotube growth according to claim 1, wherein the form-defining layer consists of the same material as the base plate.

7. The substrate for carbon nanotube growth according to claim 1, wherein the base plate consists of MgO (100) single crystal, and the form-defining layer consists of MgO which is the same material as the base plate in terms of substance.

* * * * *